US011881669B2

(12) United States Patent
Eder

(10) Patent No.: US 11,881,669 B2
(45) Date of Patent: Jan. 23, 2024

(54) TERMINAL

(71) Applicant: ELECTRO TERMINAL GMBH & CO KG, Innsbruck (AT)

(72) Inventor: Armin Eder, Absam (AT)

(73) Assignee: ELECTRO TERMINAL GMBH & CO KG, Innsbruck (AT)

(*) Notice: Subject to any disclaimer, the term of this patent is extended or adjusted under 35 U.S.C. 154(b) by 0 days.

(21) Appl. No.: 17/835,304

(22) Filed: Jun. 8, 2022

(65) Prior Publication Data

US 2022/0384967 A1 Dec. 1, 2022

(30) Foreign Application Priority Data

Jun. 18, 2021 (DE) .................... 20 2021 103 278.2

(51) Int. Cl.

| | |
|---|---|
| ***H01R 4/2437*** | (2018.01) |
| ***H01R 11/01*** | (2006.01) |
| ***H01R 11/09*** | (2006.01) |

(52) U.S. Cl.

CPC ........... *H01R 4/2437* (2013.01); *H01R 11/01* (2013.01); *H01R 11/09* (2013.01)

(58) Field of Classification Search

CPC ........ H01R 4/2437; H01R 11/01; H01R 11/09

USPC ................................ 439/417, 404, 406, 409

See application file for complete search history.

(56) References Cited

U.S. PATENT DOCUMENTS

| | | | | |
|---|---|---|---|---|
| 4,341,430 A * | 7/1982 | Crawford ............. | H01R 12/675 439/409 |
| 6,152,760 A * | 11/2000 | Reeser ................. | H01R 4/2433 439/409 |
| 11,088,473 B2 * | 8/2021 | Zäuner ................. | H01R 4/2433 |

(Continued)

FOREIGN PATENT DOCUMENTS

| | | |
|---|---|---|
| DE | 3406739 A1 | 9/1984 |
| DE | 20205665 U1 | 8/2002 |
| DE | 202019104872 U1 | 12/2020 |

(Continued)

OTHER PUBLICATIONS

Machine translation for DE 3406739 to Jones et al.

(Continued)

*Primary Examiner* — Briggitte R. Hammond

(74) *Attorney, Agent, or Firm* — The H.T. Than Law Group

(57) ABSTRACT

A terminal (1) for connection of an electrical conductor (2) without stripping, having at least one conductor insertion area (13) for inserting an electrical conductor (2), insulated with an insulating material, into the terminal (1) in a conductor insertion direction. The terminal (1) has, for each conductor insertion area (13), an actuating part (50) and an insulation-piercing contact (30) having a cutting edge (33) for cutting through the insulating material and establishing electrical contact with the electrical conductor (2). The cutting edge (33) extends about an axis of rotation along an arc. By rotating the actuating part (50) about the axis the insulation-piercing contact (30) moves between a contacting (Continued)

position, in which the cutting edge (33) intersects the conductor insertion area (13) for establishing electrical contact with an inserted electrical conductor (2), and a release position, in which the cutting edge (33) clears the conductor insertion area.

22 Claims, 4 Drawing Sheets

(56) References Cited

U.S. PATENT DOCUMENTS

| | | | | |
|---|---|---|---|---|
| 11,539,147 | B2 * | 12/2022 | Tseng .................. | H01R 4/4845 |
| 2005/0124206 | A1 | 6/2005 | Bergner et al. | |

FOREIGN PATENT DOCUMENTS

| | | | |
|---|---|---|---|
| EP | 0271413 | A1 | 6/1988 |
| WO | 2016083244 | A1 | 6/2016 |

OTHER PUBLICATIONS

Machine translation for WO 2016083244 to Görlich Wolfgang.
Machine translation for DE 20205665 to Wago Verwaltungs Gmbh.
Machine translation for DE 202019104872 to Electro Terminal Gmbh & Co Kg.
Machine translation for EP 0271413 to Joly Jean et al.

* cited by examiner

TERMINAL

FIELD OF THE INVENTION

The present invention relates to a terminal, in particular an installation terminal.

BACKGROUND

A terminal, for example an installation terminal, is used for the electrical connection of an electrical conductor. An electrical conductor is electrically contacted via the terminal in order to electrically connect said conductor, via the terminal, to a further electrical conductor, for example, which is electrically contacted in the terminal, and/or to an electrical appliance, in particular to supply electricity thereto. In this case, the terminal generally serves at the same time for mechanical mounting and/or securing of the electrical conductor.

Since the electrical conductor is electrically insulated by insulation or an insulating material, part of the insulating material has to be removed along a certain length so that the electrical conductor can be electrically contacted. This step is known as stripping. The stripped part of the electrical conductor can then be electrically contacted by means of the terminal.

A disadvantage of stripping is the relatively complex removal of the insulating material. Most notably, relatively high assembly forces are required to carry out the stripping. It can thus be necessary to use an additional tool (for example a screwdriver) in order to apply the high forces for the stripping. The stripping procedure is furthermore relatively time-consuming.

The invention is therefore based on the object of creating a terminal, in particular an installation terminal, which overcomes the above-mentioned disadvantages. In particular, the aim is to provide a terminal which is easily able to electrically contact an electrical conductor insulated with an insulating material.

This and other objects, which will be further revealed when reading the following description or which may be recognised by a person skilled in the art, are achieved by the subject matter of the independent claim.

DETAILED DESCRIPTION OF THE INVENTION

An inventive terminal, in particular an installation terminal, is provided for the connection of an electrical conductor without stripping. The terminal has at least one conductor insertion area for inserting an electrical conductor, insulated with an insulating material, into the terminal in a conductor insertion direction. The terminal furthermore has, for each conductor insertion area: an actuating part, which is rotatable about an axis of rotation, and an insulation-piercing contact having a cutting edge for cutting through the insulating material and establishing electrical contact with the electrical conductor, wherein the cutting edge extends about the axis of rotation along an arc, and wherein the insulation-piercing contact is connected to the actuating part in such a way that, via a rotation of the actuating part about the axis of rotation, the insulation-piercing contact is movable between a contacting position, in which the cutting edge intersects the conductor insertion area for establishing electrical contact with an inserted electrical conductor, and a release position, in which the cutting edge clears the conductor insertion area.

The inventive terminal has, on the one hand, the advantage that the actuating forces for cutting through the insulating material are reduced. This is the case in particular since the cutting edge, as a result of its arcuate extent about the axis of rotation, strikes the insulating material of the electrical conductor at a particularly advantageous angle (for example substantially a right-angle). The cutting edge can thus displace the insulating material particularly well, without high forces having to act on the insulation-piercing contact. The electrical contacting of an electrical conductor by means of the terminal is therefore particularly easy. As a result of the arcuate form of the cutting edge, this cutting edge, or a cutting opening formed at least partially by the cutting edge, for example in the form of a cutting slot, can be advantageously elongated. A relatively long cutting extent is thus achieved, whereby lower actuating forces are required for cutting the insulating material. On the other hand, the advantage of a particularly compact terminal is realised. This is the case in particular due to the inventive arrangement of the insulation-piercing contact with respect to the conductor insertion area in the contacting and release position and due to the cutting edge extending along the arc. Furthermore, as a result of the lower actuating forces, the actuating part of the terminal can be configured more compactly, for example in the form of a shortened lever.

In the contacting position, the cutting edge can intersect or pass through a conductor insertion plane, which is parallel to the conductor insertion direction and to the axis of rotation. The conductor insertion plane can be a (geometrical) plane, for example a plane along which the conductor insertion area extends, and/or a plane of symmetry, at least of part of the conductor insertion area. This can be provided in the form of a conductor insertion channel, for example. In the release position, the cutting edge is preferably spaced from the conductor insertion plane.

The axis of rotation is preferably arranged in the conductor insertion area or in an elongation thereof in the conductor insertion direction. This results in a particularly compact terminal, which moreover enables easy electrical contacting of the conductor. The axis of rotation is preferably transverse or perpendicular to the conductor insertion direction.

The cutting edge can at least partially delimit a cutting opening (or a plurality of cutting openings), wherein the electrical conductor is at least partially arranged in the cutting opening when the insulation-piercing contact electrically contacts the electrical conductor in the contacting position. The cutting opening is preferably at least partially a cutting slot. The cutting opening in particular ensures easy cutting-through of the insulating material and easy electrical contacting and mechanical mounting of the electrical conductor. Moreover, the insulation-piercing contact is therefore arranged very compactly with respect to the electrical conductor.

The cutting opening can be formed by two cutting portions, which are preferably integrally formed with one another; "integrally" here especially preferably means that the cutting portions are formed together from one casting, in one piece and/or in one part, particularly preferably in one part in the form of a one-part punched and bent part. The cutting opening can thus be easily produced. Moreover the cutting portions of the cutting opening have an advantageous cutting effect since the cutting portions can act on different sides and/or positions of the electrical conductor in order to cut through the insulating material. It is preferable if, in the contacting position, the electrical conductor is arranged at least partially between the cutting portions.

It is furthermore preferable if the cutting portions are designed to be resilient transversely to the conductor insertion direction, in order to electrically contact the electrical conductor in a clamping manner in the cutting opening. This results in a particularly reliable electrical contacting between the insulation-piercing contact and the electrical conductor. An advantageous mechanical mounting of the electrical conductor can furthermore be provided as a result of the clamping action. Moreover, as a result of the resilient design of the cutting portions, electrical conductors having different cross-sections and/or diameters can be easily electrically contacted.

The terminal preferably has an elastic element, for example a spring element, which is arranged in such a way that its restoring force presses the cutting edge against the electrical conductor, thereby clamping it. The elastic element therefore preferably serves for mechanically supporting the insulation-piercing contact. The elastic element can be produced from stainless steel and/or provided in the form of a clasp. The elastic element is, for example, arranged such that it encompasses the insulation-piercing contact and/or is arranged sandwich-like with the insulation-piercing contact ("sandwich arrangement").

The insulation-piercing contact may have only one cutting opening or a plurality of cutting openings. The plurality of cutting openings can be arranged to contact different electrical conductors (in particular having different cross-sections and/or diameters), which can be inserted into the terminal for example via different conductor insertion areas (preferably with two different insertion holes). The insulation-piercing contact can have a cutting slot, which is formed in multiple stages, i.e. two stages, in order to form the plurality of cutting openings (e.g. first stage: first cutting opening; second stage: second cutting opening).

The arc can be an arc of a circle or an arc of an ellipse. Alternatively or additionally, the cutting edge can have the same radial spacing from the axis of rotation along the arc. The actuating force for cutting through the insulating material can thus be particularly advantageously reduced via the arc.

It is preferable if the cutting edge, as a result of the rotation of the actuating part, is movable on a circular path with a defined radius with respect to the axis of rotation. This results in a particularly compact terminal, which can moreover electrically contact the electrical conductor with a reduced actuating force.

The insulation-piercing contact can be designed as an integral component, for example as a punched and bent part. This results in a particularly cost- and material-saving production of the insulation-piercing contact.

The terminal preferably has a contact part, wherein the insulation-piercing contact has a contact portion, which is in electrical contact with the contact part only or at least in the contacting position. This is advantageous in particular in that, via the actuating part, the insulation-piercing contact can easily be optionally electrically connected to the contact part or electrically disconnected (detached) therefrom. Most notably, an electrical connection between the conductor and the contact part can be disconnected without the conductor having to be removed from the terminal. A further advantage is that the optional electrical connection between the contact part and the contact portion is easily producible. The insulation-piercing contact can be contacted by a further insulation-piercing contact or other electrical consumer, for example, via the contact part. By way of example, it can be provided that the contact portion is disconnected and/or spaced from the contact part in the release position.

The contact portion and the contact part can be designed to correspond in such a way that, in the contacting position, they engage in one another in a comb-like and/or clamping manner for electrical contacting. This results in a particularly advantageous electrical contacting between the contact portion and the contact part. As a result of the clamping action, a mechanical mounting of the insulation-piercing contact in the contacting position can moreover be provided in an advantageous manner.

The contact part can be designed to be elongated and/or as a bar (busbar). For the comb-like mutual engagement, the contact part can be designed as a comb (as a so-called "plug connection comb" or "contact comb"). The comb then preferably has one or more comb openings, into which the one or more contact portions (if a plurality of insulation-piercing contacts are provided) can be pivoted. The contact portion is preferably designed as a contact fork. The contact fork preferably has two projections (for example in the form of two prongs), which can engage in the comb. For example, one projection of a contact fork of a first insulation-piercing contact and one projection of a contact fork of a second insulation-piercing contact can engage in a common comb opening.

If a plurality of insulation-piercing contacts are provided, these can alternatively be connected to one another via one or more flexible electrical conductors, for example in that this/these conductor(s) is/are applied to the individual insulation-piercing contacts by a material bond (welding, soldering etc.).

The contact portion can protrude radially from the insulation-piercing contact, with respect to the axis of rotation, by means of a contact area. The contact portion can therefore be provided particularly easily, for example by bending a portion of the insulation-piercing contact. Moreover, the radially protruding contact area results in advantageous electrical contacting with the contact part, since the rotation of the insulation-piercing contact about the axis of rotation brings the contact area easily into electrical contact with the contact part.

It is preferable if the terminal has a plurality of conductor insertion areas, each having a separate actuating part and insulation-piercing contact, and the insulation-piercing contacts can be electrically contacted accordingly via the contact part. By way of example, an electrical connection of two insulation-piercing contacts, which is established via the contact part, can be disconnected in that one of the insulation-piercing contacts is moved into the release position. The electrical connection between electrical conductors in the terminal can therefore be disconnected in particular without one or more of these electrical conductors being removed from the terminal.

A rotational movement between the contacting position and the release position can be in an angle of 60 to 120°. This means that, as a result of a corresponding rotational movement of the actuating part through an angle of 60 to 120°, the insulation-piercing contact can be moved from the release position into the contacting position, or from the contacting position into the release position. The rotational movement is preferably through 90° in order to switch between the contacting position and the release position via the rotation of the actuating part.

The actuating part can have a lever portion for rotating the actuating part about the axis of rotation. The actuating force for cutting through the insulating material of the electrical conductor can thus be applied particularly easily. In the contacting position, the lever portion preferably extends parallel to the insertion direction and optionally parallel to the conductor insertion area. This results in a particularly structurally compact terminal.

The actuating part can have a rotational-positioning portion, which, in the contacting position and/or the release position, forms a stop and/or a catch mechanism with a corresponding rotational-positioning portion. The assembly and/or dismantling of the electrical conductor by means of the terminal is thus made easier. Moreover, the catch mechanism represents a particularly advantageous securing mechanism for the electrical conductor which is electrically contacted in the terminal.

The conductor insertion area, at least in the contacting position, is preferably surrounded radially circumferentially with respect to the conductor insertion direction in an electrically insulating manner.

The terminal can furthermore have an insulating-material housing, in which the actuating part is rotatably received. The insulating-material housing can have or form the corresponding rotational-positioning portion. The insulating-material housing can be formed in one part or in multiple parts. The insulating-material housing most notably provides protection against unwanted electrical shocks and/or short circuits. By way of example, the insulating-material housing is made of plastic.

The insulating-material housing can have a conductor channel, which forms at least part of the conductor insertion area. In the contacting position, it can therefore be provided for example that the cutting edge intersects and/or passes through the conductor insertion channel, and/or is lowered therein, in particular lowered further than in the release position. The conductor insertion channel preferably defines the conductor insertion direction. The electrical conductor can thus be easily inserted into the terminal.

The conductor insertion area, at least in the contacting position, can be delimited by the insulating-material housing and the actuating part, preferably the lever portion thereof. This results in a particularly advantageous partitioning-off of the conductor insertion area in the contacting position, whereby unwanted electrical contacting with the conductor insertion area can be prevented. Moreover, the advantage of a more compact insulating-material housing is realised, since the actuating lever provides part of the delimitation for covering the electrical conductor.

The insulating-material housing can have a recess (i.e. a clearance), such that at least part of the insulation-piercing contact is arranged or displaced in the recess, whilst this insulation-piercing contact is moved via a rotation of the actuating part. The recess preferably extends in such a way that it follows a movement path of the part of the insulation-piercing contact upon a rotation of the actuating part. A particularly compact and weight-saving terminal can be provided as a result of the recess. The recess is preferably a guide groove. By way of example, the guide groove is designed such that it guides the at least one part of the insulation-piercing contact whilst it is moved via a rotation of the actuating part. The guide groove in particular advantageously ensures that the insulation-piercing contact, during the rotation of the actuating part, is received in the terminal in a defined position. The guide groove in particular prevents the insulation-piercing contact from executing a translatory movement parallel to the axis of rotation. The part of the insulation-piercing contact preferably has the contact area.

The insulating-material housing can have a base in which the recess is at least partially formed. The terminal can thus be formed in a particularly compact manner. If the recess optionally serves as a guide groove, the insulation-piercing contact can therefore moreover be brought into an advantageous position with respect to the conductor insertion area, in which the cutting edge cuts through the insulating material of the electrical conductor at a particularly advantageous angle. In this case, the guide groove can be provided so that the actuating forces are increased, since there is a sliding friction between the guide groove and the insulation-piercing contact, for example. However, the recess can also be designed such that there is no sliding friction with the insulation-piercing contact, since a spacing is present for example between the recess-delimiting walls (side walls, base etc.) on the one hand and the insulation-piercing contact on the other. The actuating forces can thus be kept particularly low.

The insulating-material housing, preferably the above-mentioned base, can have a bulge in which the recess is at least partially formed. It is thus possible to save on material and the terminal as a whole can be made more compact, since additional material is only provided at the point in which the recess at least partially extends. This point then therefore forms the bulge.

DESCRIPTION OF A PREFERRED EMBODIMENT

A detailed description of the figures is given below. In the figures.

Figure 1:
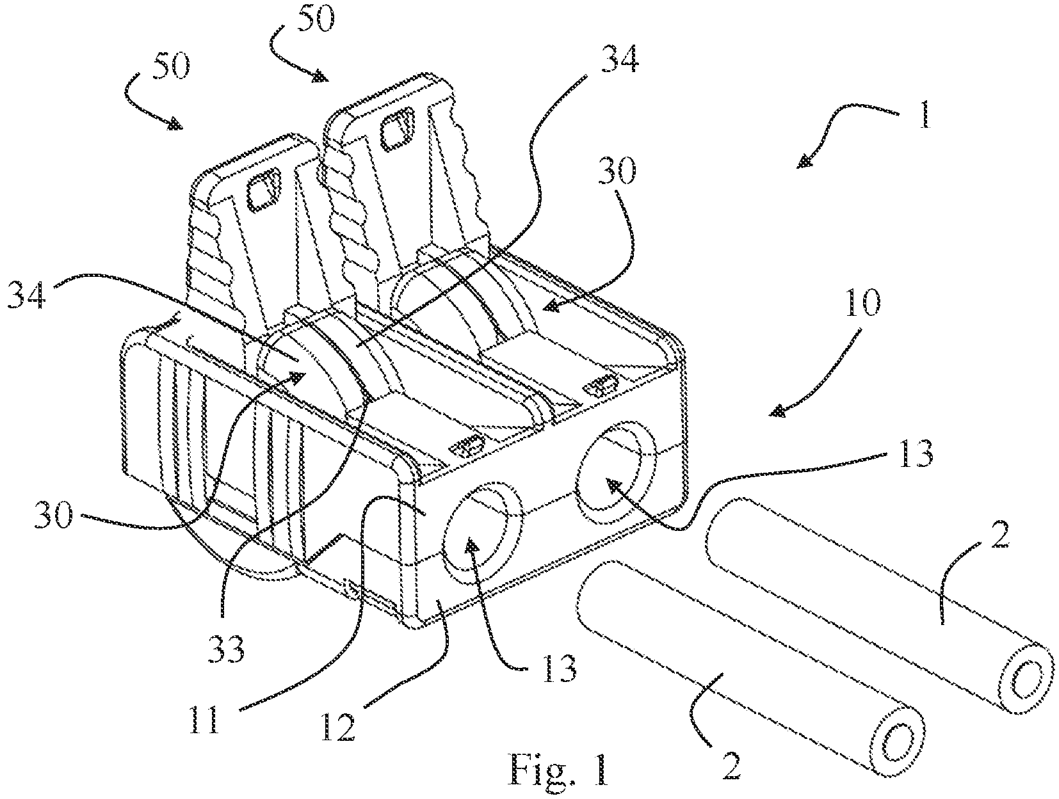
FIG. 1 shows a schematic perspective view of a preferred embodiment of the inventive terminal in the release position.

FIGS. 1 to 12 show, by way of example, a preferred embodiment of a terminal according to the invention. The terminal 1 is used in general for the electrical connection of an electrical conductor 2 (flexible or rigid). By way of example, the terminal 1 can be provided for connecting a first electrical conductor 2 to a further (second) electrical conductor 2, as illustrated by way of example in FIGS. 1 to 5; the terminal 1 can also be used for the electrical connection of more than two electrical conductors. It is also possible that the terminal 1 is only designed or used for the electrical connection of a single electrical conductor 1, for example for electrical connection to an electrical consumer (e.g. an electrical appliance). The terminal 1 can be an installation terminal, for example.

The electrical conductor 2 conventionally has insulation or an insulating material, wherein the insulating material sheathes a wire or a conductor core in order to electrically insulate the conductor core and therefore serve as touch protection. The insulating material is produced from an electrically insulating material, for example a plastic. The conductor core conventionally consists of a (metallic) wire or a plurality of twisted wires. The electrical currents of the electrical conductor 2 are conducted via the conductor core.

The terminal 1, as shall be described in more detail below, is suitable for a connection of the electrical conductor 2 without stripping. This means that the terminal 1 enables an electrical conductor 2 to be electrically contacted by means of the terminal in that the electrical conductor 2 does not have to be stripped; therefore, before the insertion of the electrical conductor 2 into the terminal 1, it is not necessary to remove part of the insulating material along a certain length of the electrical conductor 2 so that it can be electrically contacted in the terminal 1.

The terminal 1 can have a housing (insulating-material housing) 10, which is provided in general for insulation of the electrical connection provided by the terminal 1. The housing 10 is therefore designed as an insulating-material housing. The housing 10 is preferably made of an insulating material, for example plastic. As can be seen in the figures, the housing 10 can be formed in multiple parts and can therefore have at least or only a first housing part 11 and a second housing part 12. The first housing part 11 is preferably designed as a housing upper part or housing cover. The second housing part 12 is preferably designed as a housing lower part or housing base.

The housing parts 11, 12 are connected to one another in order to form the housing 10. By way of example, the connection of the housing parts 11, 12 can be realised by means of a force- and/or form-fitting connection. For example, it is conceivable that the housing parts 11, 12 have mutually corresponding connecting elements, which are in (corresponding) engagement with one another in order to connect or attach the housing parts 11, 12 to one another. The connecting elements can be designed for example as a snap and/or latching connection, so that, as a result of simply snapping or latching the housing part 11 onto the housing part 12, they can be connected or attached to one another. However, the invention is not restricted to a design of the housing 10 which comprises multiple parts. By way of example, the housing 10 can also be provided in one part, for example in that the previously described housing parts 11, 12 are integrally formed with one another.

The terminal 1 has at least one conductor insertion area 13, which is suitable for inserting an electrical conductor such as the electrical conductor 2 into the terminal 1 in a conductor insertion direction. In the exemplary embodiment shown in the figures, the terminal 1 has two conductor insertion areas 13, namely one for the (first) electrical conductor 2 and another for the further (second) electrical conductor 2. However, the terminal 1 is not restricted to a particular number of conductor insertion areas. By way of example, the terminal 1 can also have only one conductor insertion area for a single electrical conductor. It is also conceivable that the terminal 1 has more than two conductor insertion areas 13. Only one of the conductor insertion areas 13 shown in the figures will be described below. This description applies analogously to the further conductor insertion area 13 and, if present, each of the other further conductor insertion areas.

The conductor insertion area 13, at least in the contacting position, can be surrounded radially circumferentially with respect to the conductor insertion direction in an electrically insulating manner. This radially circumferential electrical insulation can be configured for example such that it defines the conductor insertion direction. As illustrated by way of example in the figures, the conductor insertion area 13 can be formed at least partially by a conductor insertion channel or it can be a conductor insertion channel. The conductor insertion area 13 preferably has a conductor insertion opening. The conductor insertion channel can be designed to define the conductor insertion direction of the conductor insertion area 13. The housing 10 can have or form the conductor insertion area 13, i.e. the conductor insertion channel, for example. By way of example, the conductor insertion area is delimited, on the one hand, by the housing upper part 11 and, on the other, by the housing lower part 12.

The terminal 1 has an actuating part 50 for the (i.e. each) conductor insertion area 13. The actuating part 50 is rotatable about an axis of rotation, for example in that the actuating part 50 is rotatably received in the housing 10. The axis of rotation can be arranged such that it is arranged in the conductor insertion area 13 or an elongation thereof in the conductor insertion direction. This elongation can have a design which differs from that of the conductor insertion area 13, for example a design which is not formed by a or the conductor insertion channel. It is preferable if the actuating part 50 has a mounting area, which is mounted or received in a corresponding mounting area of the housing 10, so that the actuating part 50 is received to be rotatable about the axis of rotation. The housing-side mounting area can be formed in the first housing part 11 and/or in the second housing part 12. It is preferable if the mounting area of the actuating part 50 and the mounting area of the housing 11 are designed to correspond to one another, for example in that the mounting area in the case of the actuating part is designed as a recess and the mounting area in the case of the housing 10 is designed as a projection.

Moreover, the terminal 1 has an insulation-piercing contact 30 for the conductor insertion area 13. The insulation-piercing contact 30 has one or more cutting edges 33, which is/are designed to cut through the insulating material of the electrical conductor 2 so that (without stripping) it thereby comes into electrical contact with the electrical conductor 2 and its conductor core and clamps them. In the schematic sectional views according to FIGS. 3 and 5, the cutting edge 33 (i.e. one of the one or more cutting edges 33) can be seen particularly clearly. It can be seen that the cutting edge 33 extends about the axis of rotation of the actuating part 50 along an arc. The insulation-piercing contact 30 is therefore designed to be at least partially arcuate as a result of the cutting edge 33. In the preferred embodiment illustrated by way of example in the figures, the arc is an arc of a circle and/or has the same radial spacing from the axis of rotation along the arc. In other embodiments, the arc can also be an arc of an ellipse.

Figure 3:
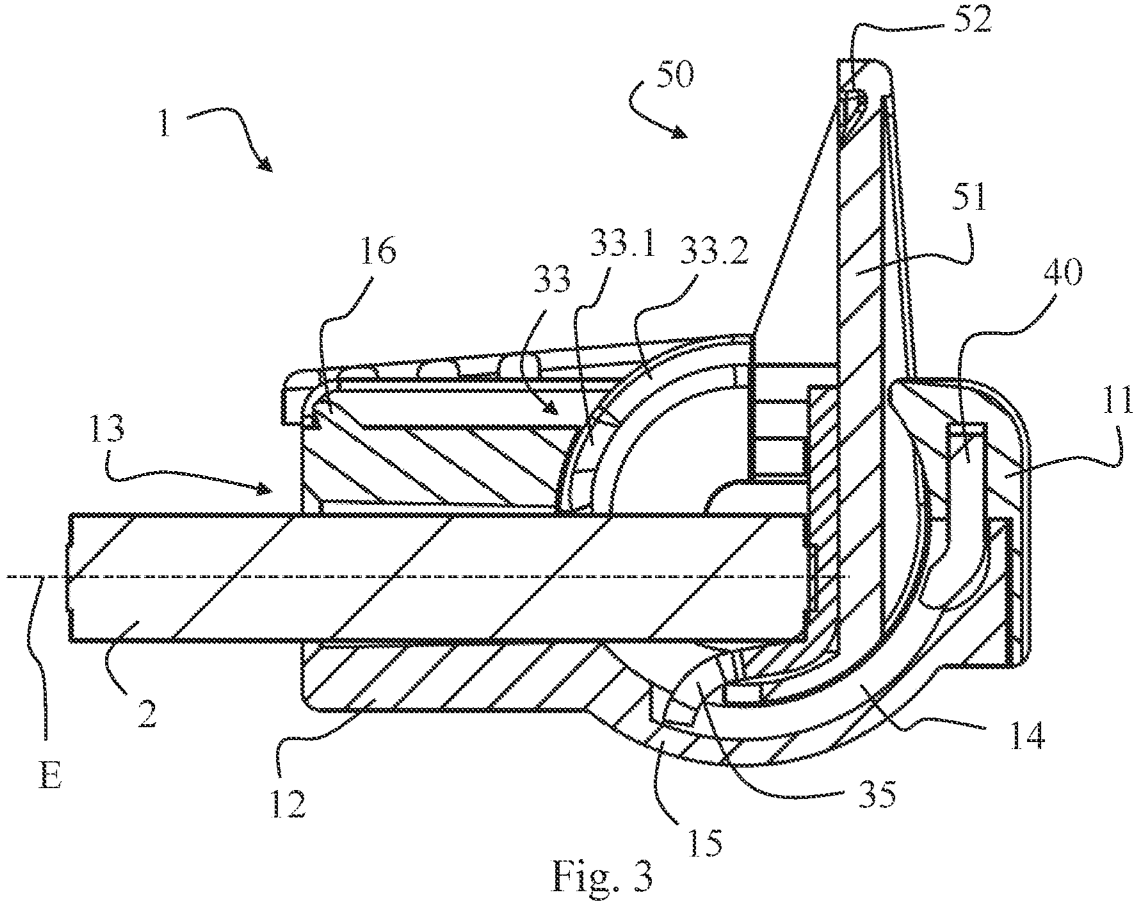
FIG. 3 shows a schematic sectional view of the terminal shown in FIG. 2, along the section line in FIG. 2.
Figure 4:
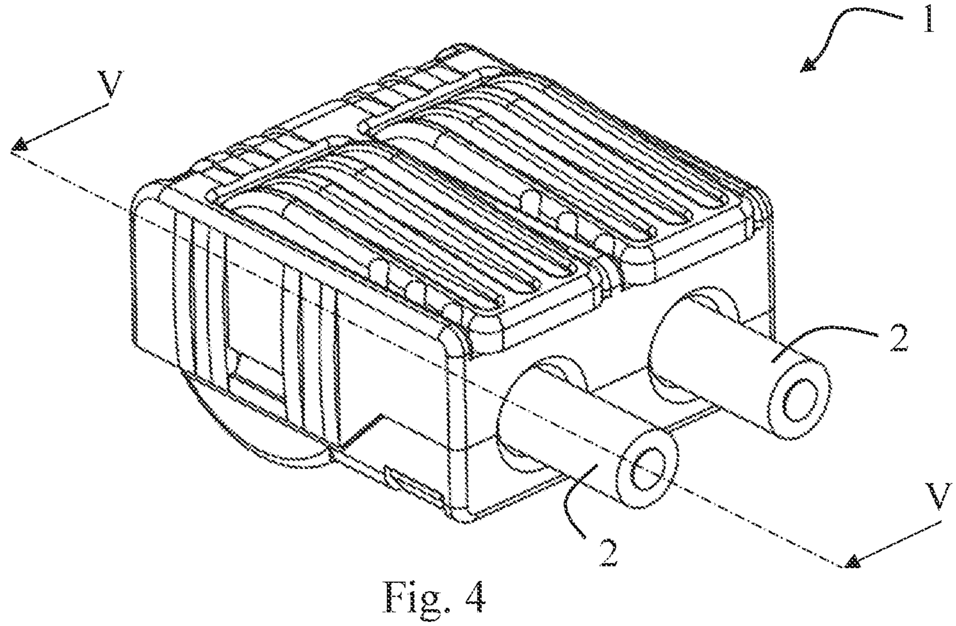
FIG. 4 shows a schematic perspective view of the terminal shown in FIGS. 2 and 3, wherein the insulation-piercing contact is moved into the contacting position by means of the actuating part.

As illustrated by way of example in FIG. 3, the cutting edge 33 can have a first cutting edge area 33.1 and a second cutting edge area 33.2. The first cutting edge area 33.1 is preferably the area of the cutting edge 33 which is the first to come into contact with the insulating material of the electrical conductor in order to cut through it; the second cutting edge area 33.2 is then the area that adjoins the first cutting edge area 33.1 and continues to cut through the insulating manner in a corresponding manner. The first cutting edge area 33.1 is preferably designed to extend at an angle with respect to the second cutting edge area 33.2.

The cutting edge 33 can at least partially delimit a cutting opening. For example, as in the embodiment illustrated by way of example in the figures, the cutting opening can be designed to be substantially V-shaped. It is preferable if the cutting opening is delimited at least by the first cutting edge area 33.1 and preferably by the second cutting edge area 33.2. For example, the first cutting edge area 33.1 of the one cutting edge 33 and the first cutting edge area 33.1 of the other cutting edge 33 can form the V shape of the cutting opening. In this case, the two first cutting edge areas 33.1 can therefore extend at an angle with respect to the respective second cutting edge area 33.2. It is preferable if the second cutting edge areas 33.2 form a slot area (i.e. preferably an area in which the cutting opening has a substantially constant width).

Figure 2:
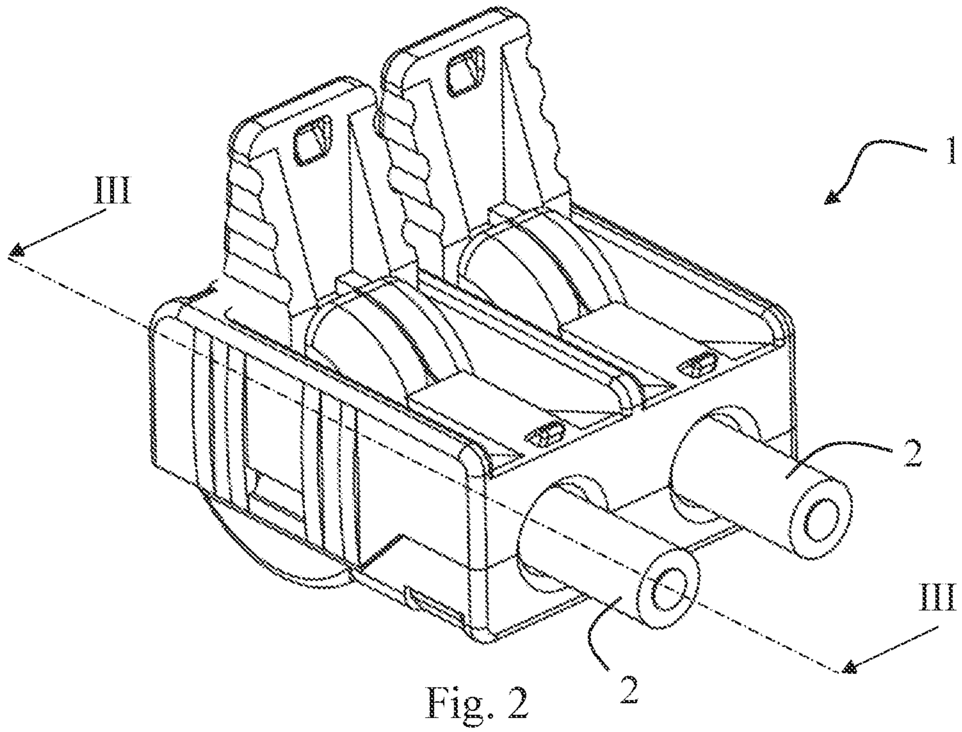
FIG. 2 shows a schematic perspective view of the terminal shown in FIG. 1, wherein electrical conductors are inserted (placed) in the terminal.

As can be seen most notably in FIGS. 1 and 2, the insulation-piercing contact 33 can have two cutting portions 34. These are preferably integrally formed with one another, although they can also be formed separately from one another in other embodiments. Each of the cutting portions 34 preferably has a respective cutting edge 33. The cutting portions 34 are preferably arranged such that they at least partially delimit or form the cutting opening. In particular, the cutting portions 34 can be designed to be resilient transversely, preferably perpendicularly, to the conductor insertion direction. The cutting portions 34 and therefore the cutting opening can thus electrically contact the electrical conductor 2 in a clamping manner. Furthermore, as a result of this resilient design, it is possible to clamp electrical conductors 2 with different diameters. The cutting portions 34 can extend about the axis of rotation along an arc (arc of a circle or arc of an ellipse, etc.), for example along the arc of the cutting edge 33.

The insulation-piercing contact 30 can be produced by means of different production methods, for example in a reshaping and/or separation process. It is preferable if the insulation-piercing contact 30 is designed as an integral component, preferably as a punched and bent part. The insulation-piercing contact 30 can be produced from a metal sheet. The insulation-piercing contact 30 preferably has the same thickness throughout, apart from at the at least one cutting edge 33.

The insulation-piercing contact 30 is connected to the actuating part 50. A movement of the insulation-piercing contact 30 can thus take place without tools by means of the actuating part 50, for example by means of a lever actuation. The connection between the insulation-piercing contact 30 and the actuating part 50 can be realised directly or indirectly. The insulation-piercing contact 30 is preferably connected to the actuating part 50 via a force- and/or form-fitting connection. The actuating part 50 can have an assembly portion, for example, on and/or in which the insulation-piercing contact 30 is at least partially received in order to be connected to the actuating part 50. In this case, the connection between the insulation-piercing contact 30 and the actuating part 50 is such that, upon a rotation of the actuating part 50 about the axis of rotation, the insulation-piercing contact 30 rotates together with the actuating part 50. Via the rotation of the actuating part 50 about the axis of rotation, the insulation-piercing contact 30 can therefore be moved between a release position and a contacting position. The release position is illustrated by way of example in FIGS. 1 to 3 and the contacting position is illustrated by way of example in FIGS. 4 to 12.

As can be seen in FIGS. 1 to 3, the cutting edge 33 clears the conductor insertion area 13 in the release position. In the release position, the electrical conductor 2 can therefore be inserted or placed in the terminal 1 and removed from it again. In this case, the cutting edge 33 is preferably arranged such that at least part of the cutting edge 33 is not in the way of the electrical conductor 2 when this latter is inserted into the terminal 1 via the conductor insertion area 13 for electrical contacting. As illustrated in FIG. 3, in the release position, the cutting edge 33, in particular the first cutting edge area 33.1 and/or the second cutting edge area 33.2, can be arranged above the conductor insertion area 13 and/or the electrical conductor 2. In the release position, the electrical conductor 2 can then be inserted into the terminal 1 until the electrical conductor 2, i.e. in particular its distal end, abuts against a stop in the terminal 1. The stop can be arranged such that, when the electrical conductor 2 abuts against the stop, the electrical conductor 2 is in a position in which electrical contacting of the electrical conductor 2 and the cutting-through of the insulating material can take place by means of the insulation-piercing contact 30. The stop can be formed by the insulation-piercing contact 30 and/or the actuating part 50.

The movement of the actuating part 50 into the contacting position and therefore the electrical contacting of the electrical conductor 2, without stripping, by means of the insulation-piercing contact 30 and its cutting edge 33 takes place as follows with reference to FIGS. 1 to 4. Via a rotation of the actuating part 50 about the axis of rotation, the actuating part 50 is moved from the release position shown in FIGS. 1 to 3 in the direction of the contacting position shown in FIGS. 4 and 5. As a result of this movement, the cutting edge 33 moves relative to the electrical conductor 2. The cutting edge 33 thus comes into contact with the insulating material of the electrical conductor 2. The relative movement between the insulation-piercing contact 30 or cutting edge 33 and the insulating material will then cut through the latter and ultimately, namely in the contacting position illustrated by way of example in FIG. 5, result in electrical contact with the electrical conductor 2 or its conductor core. The insulation-piercing contact 30 is then in electrical contact with the electrical conductor 2, namely via the cutting edge 33. It is preferable if, in the contacting position, at least or only the cutting edge area 33.1 and/or the cutting edge area 33.2 electrically contacts the electrical conductor 2 or its conductor core. If the cutting opening of the insulation-piercing contact 30 is present, in the contacting position, the electrical conductor 2 is then at least partially arranged in the cutting opening.

Since the cutting edge 33 extends about the axis of rotation along an arc, the cutting edge 33 will cut through the insulating material of the electrical conductor 2 during the rotation of the actuating part 50 through an advantageous angle and along a relatively long cutting path. It is thus unnecessary to have a high actuating force act on the actuating part 50 in order to cut through the insulating material. The electrical contacting of the electrical conductor 2 is thus made easier by the terminal 1. Furthermore, the terminal 1 is more compact as a result of the cutting edge 33 extending in an arc. It is particularly advantageous if the cutting edge 30 is movable with respect to the axis of rotation as a result of the rotation of the actuating part 50 on a circular path with a defined radius. The actuating forces can thus be further reduced.

Figure 5:
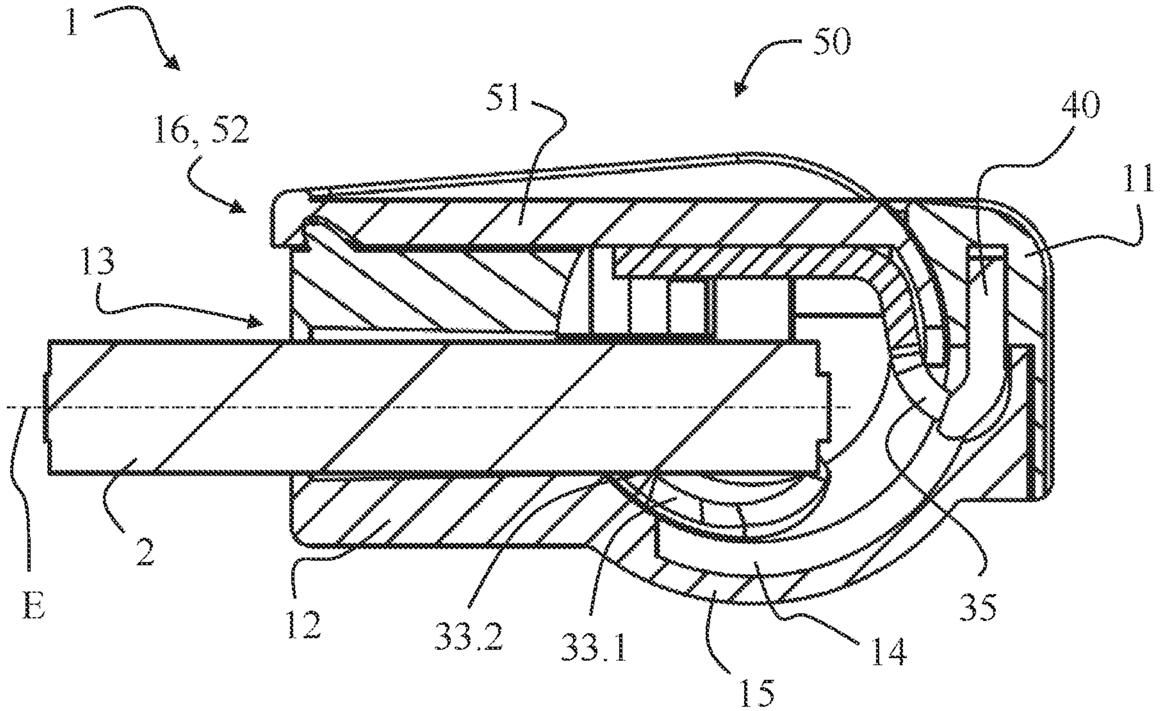
FIG. 5 shows a schematic sectional view of the terminal shown in FIG. 4, along the section line V-V in FIG. 4.
Figure 6:
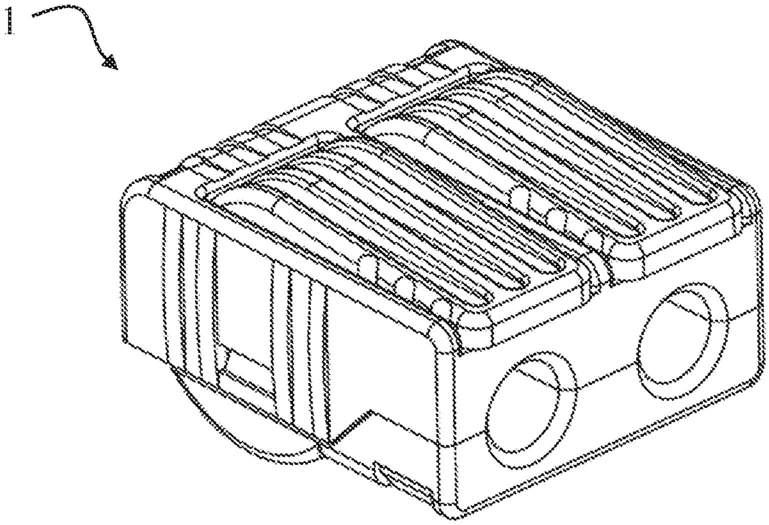
FIG. 6 shows a schematic perspective view of the terminal shown in FIGS. 1 to 5, in which the electrical conductors are not inserted into the terminal and the insulation-piercing contacts are moved into the contacting position by means of the actuating lever.
Figure 7:
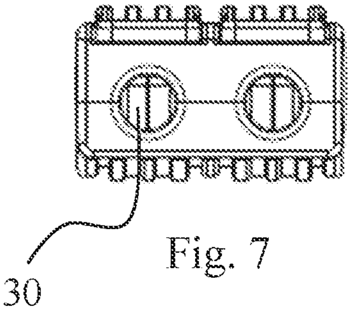
FIGS. 7 to 12 show different schematic views of the terminal shown in FIG. 6.
Figure 8:
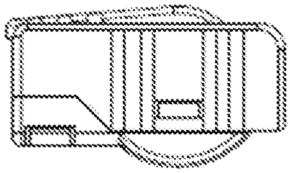
Figure 9:
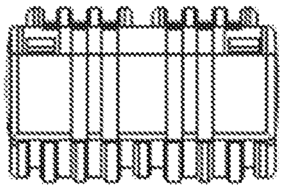
Figure 10:
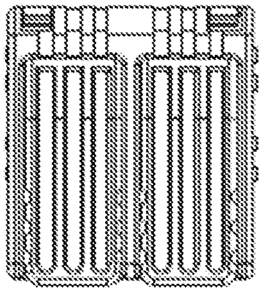
Figure 11:
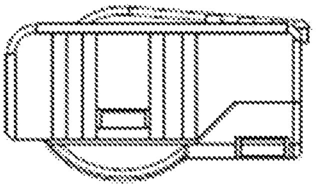
Figure 12:
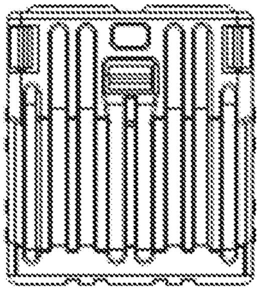

As can be seen in FIG. 6, in the contacting position, the cutting edge 33 is arranged such that it intersects the conductor insertion area 13. This means that the cutting edge 33 passes through the conductor insertion area 13 or is lowered therein. It can be provided that, in the contacting position, the cutting edge 33 is lowered further into the conductor insertion area than it is in the release position. In the contacting position, therefore, the cutting edge 33 does not clear the conductor insertion area 13. If no electrical conductor 2 has been inserted into the terminal 1 in the contacting position, as illustrated for example in FIG. 6, it is not possible to insert an electrical conductor 2 into the terminal 1 for electrical contacting. In other words: The electrical conductor 2 or its distal end cannot be inserted into the terminal 1 further than the cutting edge 33. As illustrated by way of example in FIG. 5, the terminal 1 can be configured in particular such that, in the contacting position, the cutting edge 33 intersects or passes through a conductor insertion plane E, which is parallel to the conductor insertion direction and to the axis of rotation. With reference to FIGS. 3 and 5, the conductor insertion plane E extends from left to right in the horizontal. The conductor insertion plane E can, for example, be spanned by the one or more conductor insertion directions of the one or more conductor insertion areas 13. The conductor insertion plane E can also be a geometrical plane, for example a plane of symmetry, of the conductor insertion area 13. As illustrated by way of example in FIG. 3, in the release position, the cutting edge 33 is preferably spaced from the conductor insertion plane E.

As can be seen in FIGS. 3 and 5, the insulation-piercing contact 30 can have a contact portion 35, which is electrically contactable by a contact part 40. The electrical contact between the contact portion 35 and the contact part 40 can be established as a result of a rotation of the actuating part 50. If the insulation-piercing contact 30 is in the contacting position, the contact portion 35 is in electrical contact with the contact part 40. This state can be seen by way of example in FIG. 5. In this case, the contact portion 35 and the contact part 40 are preferably configured in such a way that, in the contacting position, they engage with one another in a comb-like and/or clamping manner in order to provide the electrical contacting. It is preferable if the electrical contact between the contact portion 35 and the contact part 40 is established only in the contacting position. In the release position, the contact portion 35 is therefore preferably electrically disconnected from the contact part 40. An exemplary position of the contact area 35 relative to the contact part 40 in the release position is illustrated in FIG. 3. As can be seen in FIG. 3, in the release position, the contact portion 35 can be spaced and/or detached from the contact part 40 so that they are electrically disconnected from one another.

The contact portion 35 can be formed in different ways. For example, the contact portion 35 can protrude radially from the insulation-piercing contact 30, with respect to the axis of rotation, by means of a contact area. It is preferable if the contact portion 35 is integrally formed with the cutting edge 33. For example, the contact portion 35 can be formed by bending and/or punching, for example from the same metal sheet from which the cutting edge 33 is also provided. As can be seen by way of example in FIG. 3, the contact portion 35 can extend from the stop of the insulation-piercing contact 30 against which the electrical conductor 2 (or the distal end thereof) abuts in the release position.

The contact part 40 can provide different functions. It is preferable if a plurality of insulation-piercing contacts 30 are electrically contactable via the contact part 40 in order to electrically connect these insulation-piercing contacts 30 to one another via the contact part 40. An electrical connection of a first electrical conductor 2 to a second electrical conductor 2 can therefore be realised via the contact part 40. This electrical connection can then be easily disconnected in that the actuating part 50 moves into the release position and the contact portion 35 is therefore electrically disconnected from the contact part 40.

The contact part 40 can be arranged in different ways in the terminal 1. As can be seen in FIGS. 3 and 5, the contact part 40 can be received for example in the housing 10. For example, the contact part 40 can be at least partially received or arranged in the upper housing part 11. It is preferable if the contact part 40, starting from the upper housing part 11, extends into the lower housing part 12. The contact part 40 can be connected to the housing 10, preferably in the upper housing part 11, via a force- and/or form-fit.

A recess (i.e. clearance) 14, which the terminal 1 can optionally have, can furthermore be seen in FIGS. 3 and 5. The recess 14 can be provided in the form of a groove and is preferably a guide groove 14. The recess 14 or guide groove in particular offers the advantage of the insulation-piercing contact 30 being received in a secure manner during its rotation. In particular, a defined position of the contact portion 35 relative to the contact part 40 can be brought about via the guide groove 14. It is thus ensured that a reliable electrical connection between the contact portion 35 and the contact part 40 can be provided. The recess 14 is in particular designed such that at least part of the insulation-piercing contact 30 (for example the contact portion 35) is arranged in the recess 14 whilst the insulation-piercing contact 30 is moved via a rotation of the actuating part 50. The recess 14 can extend for example along a direction which corresponds to the movement path of the part of the insulation-piercing contact 30 during the rotation of the actuating part 50 about the axis of rotation. The recess 14 can be at least partially formed in a base, for example in the base provided by the housing lower part 12. The housing 10 can have a bulge 15, which is formed for example by the base of the housing 10 and/or the housing lower part 12. For a particularly space-saving design of the terminal 1, the recess 14 can be at least partially formed in the bulge 15.

The actuating part 50 can be arranged such that a rotational movement of the actuating part 50 in an angular range of 60 to 120°, preferably through 90°, moves the insulation-piercing contact 30 from the release position into the contacting position, or from the contacting position into the release position. For easy actuation of the actuating part 50, this can have a lever portion 51. In the contacting position, the lever portion 51 then preferably extends parallel to the conductor insertion direction and preferably adjacent to the conductor insertion area 13. The actuating part 50 can serve to delimit the conductor insertion area 13 when the insulation-piercing contact 30 is moved into the contacting position. In the contacting position, the conductor insertion area 13 can then be delimited in particular by the housing 10 and the actuating lever 50, for example by the lever portion 51 thereof.

As can be seen in particular in FIG. 5, the actuating part 50 can have a rotational-positioning portion 52, which, in the contacting position, forms a stop and/or a catch mechanism with a corresponding rotational-positioning portion 16. Alternatively or additionally, in the release position, the rotational-positioning portion 52 can form a stop and/or a catch mechanism with the corresponding rotational-positioning portion 16. The corresponding rotational-positioning portion 16 is preferably formed by the housing 10. It is preferable if the rotational-positioning portion 52 is provided on the lever portion 51 and/or a distal end of the actuating part 50 or the lever portion 51. The corresponding rotational-positioning portion 16 is preferably formed in the housing upper part 11.

The present invention is not restricted to the preferred embodiment above so long as it is comprised by the subject matter of the following claims.

The invention claimed is:

1. Terminal (1) for connection of an electrical conductor (2) without stripping, having at least one conductor insertion area (13) for inserting an electrical conductor (2), insulated with an insulating material, into the terminal (1) in a conductor insertion direction, wherein the terminal (1) furthermore has, for each conductor insertion area (13):

an actuating part (50), which is rotatable about an axis of rotation, and an insulation-piercing contact (30) having a cutting edge (33) for cutting through the insulating material and establishing electrical contact with the electrical conductor (2), wherein the cutting edge (33) extends about the axis of rotation along an arc, wherein the insulation-piercing contact (30) is connected to the actuating part (50) in such a way that, via a rotation of the actuating part (50) about the axis of rotation, the insulation-piercing contact (30) is movable between a contacting position, in which the cutting edge (33) intersects the conductor insertion area (13) for establishing electrical contact with an inserted electrical conductor (2), and a release position, in which the cutting edge (33) clears the conductor insertion area wherein the terminal (1) has a contract part (40), and wherein the insulation-piercing contact (30) has a contact portion (35), which is in electrical contact with the contact part (40) only in the contacting position.

2. Terminal (1) according to claim 1, wherein, in the contacting position, the cutting edge (33) intersects or passes through a conductor insertion plane (E), which is parallel to the conductor insertion direction and to the axis of rotation.

3. Terminal (1) according to claim 1, wherein the axis of rotation is arranged in the conductor insertion area (13) or an elongation thereof in the conductor insertion direction.

4. Terminal (1) according to claim 1, wherein the cutting edge (33) at least partially delimits a cutting opening, and wherein the electrical conductor (2) is at least partially arranged in the cutting opening when the insulation-piercing contact (30) electrically contacts the electrical conductor (2) in the contacting position.

5. Terminal (1) according to claim 4, wherein the cutting opening is formed by two cutting portions (34) in order to electrically contact the electrical conductor (2) in a clamping manner in the cutting opening.

6. Terminal (1) according to claim 1, wherein the arc is an arc of a circle or an arc of an ellipse, and/or wherein the cutting edge (33) has a same radial spacing from the axis of rotation along the arc.

7. Terminal (1) according to claim 1, wherein the cutting edge (33), as a result of the rotation of the actuating part (50), is movable on a circular path with a defined radius with respect to the axis of rotation.

8. Terminal (1) according to claim 1, wherein the insulation-piercing contact (30) is designed as an integral component.

9. Terminal (1) according to claim 1, wherein the contact portion (35) and the contact part (40) are designed to correspond in such a way that, in the contacting position, they engage in one another in a comb-like and/or clamping manner for electrical contacting.

10. Terminal (1) according to claim 1, wherein the contact portion (35) protrudes radially from the insulation-piercing contact (30), with respect to the axis of rotation, by means of a contact area.

11. Terminal (1) according to claim 1, wherein, if the terminal (1) has a plurality of conductor insertion areas (13), each having a separate actuating part (50) and insulation-piercing contact (30), the insulation-piercing contacts (30) can be electrically contacted accordingly via the contact part (40).

12. Terminal (1) according to claim 1, wherein a rotational movement between the contacting position and the release position is in an angular range of 60 to 120°.

13. Terminal (1) according to claim 1, wherein the actuating part (50) has a lever portion (51) for rotating the actuating part (50) about the axis of rotation.

14. Terminal (1) according to claim 1, wherein the actuating part (50) has a rotational-positioning portion (52), which, in the contacting position and/or in the release position, forms a stop and/or a catch mechanism with a corresponding rotational-positioning portion (16).

15. Terminal (1) according to claim 1, wherein the conductor insertion area (13), at least in the contacting position, is surrounded radially circumferentially with respect to the conductor insertion direction in an electrically insulating manner.

16. Terminal (1) according to claim 1, further having an insulating-material housing (10), in which the actuating part (50) is rotatably received.

17. Terminal (1) according to claim 16, wherein the insulating-material housing (10) has a conductor insertion channel, which forms at least part of the conductor insertion area (13) and/or defines the conductor insertion direction.

18. Terminal (1) according to claim 16, wherein the conductor insertion area (13), at least in the contacting position, is delimited by the insulating-material housing (10) and the actuating part (50).

19. Terminal (1) according to claim 16, wherein the insulating-material housing (10) has a recess (14) such that at least part of the insulation-piercing contact (30) is arranged in the recess (14) whilst the at least part of the insulation-piercing contact (30) is moved via a rotation of the actuating part (50).

20. Terminal (1) according to claim 19, wherein the insulating-material housing (10) has a base in which the recess (14) is at least partially formed.

21. Terminal (1) according to claim 19, wherein the insulating-material housing (10) has a bulge (15), in which the recess (14) is at least partially formed.

22. Terminal (1) for connection of an electrical conductor (2) without stripping, having at least one conductor insertion area (13) for inserting an electrical conductor (2), insulated with an insulating material, into the terminal (1) in a conductor insertion direction, wherein the terminal (1) furthermore has, for each conductor insertion area (13):

an actuating part (50), which is rotatable about an axis of rotation, and an insulation-piercing contact (30) having a cutting edge (33) for cutting through the insulating material and establishing electrical contact with the electrical conductor (2), wherein the cutting edge (33) extends about the axis of rotation along an arc, wherein the insulation-piercing contact (30) is connected to the actuating part (50) in such a way that, via a rotation of the actuating part (50) about the axis of rotation, the insulation-piercing contact (30) is movable between a contacting position, in which the cutting edge (33) intersects the conductor insertion area (13) for establishing electrical contact with an inserted electrical conductor (2), and a release position, in which the cutting edge (33) clears the conductor insertion area wherein the terminal (1) has a contract part (40), and wherein the insulation-piercing contact (30) has a contact portion (35), which is in electrical contact with the contact part (40) at least in the contacting position.

* * * * *